(12) United States Patent
Brooks et al.

(10) Patent No.: US 8,996,174 B2
(45) Date of Patent: Mar. 31, 2015

(54) USER INTERFACES FOR ROBOT TRAINING

(71) Applicant: Rethink Robotics, Inc., Boston, MA (US)

(72) Inventors: Rodney Brooks, Cambridge, MA (US); Bruce Blumberg, Concord, MA (US); Noelle Dye, Charlestown, MA (US); Paula Long, Charlestown, MA (US)

(73) Assignee: Rethink Robotics, Inc., Boston, MA (US)

( * ) Notice: Subject to any disclaimer, the term of this patent is extended or adjusted under 35 U.S.C. 154(b) by 159 days.

(21) Appl. No.: 13/621,519

(22) Filed: Sep. 17, 2012

(65) Prior Publication Data

US 2013/0345872 A1    Dec. 26, 2013

Related U.S. Application Data

(60) Provisional application No. 61/662,646, filed on Jun. 21, 2012, provisional application No. 61/676,586, filed on Jul. 27, 2012.

(51) Int. Cl.
*B25J 9/02* (2006.01)
*B25J 9/00* (2006.01)
*B25J 13/08* (2006.01)
(Continued)

(52) U.S. Cl.
CPC ............... *G06K 9/66* (2013.01); *B25J 9/0087* (2013.01); *B25J 13/084* (2013.01); *G05B 19/42* (2013.01); *G05B 2219/39451* (2013.01); *G05B 2219/40116* (2013.01); *G06F 17/00* (2013.01); *G06K 9/2081* (2013.01); *G06K 9/6255* (2013.01); *G06N 99/005* (2013.01); *Y10S 901/09* (2013.01); *Y10S 901/31* (2013.01); *Y10S 901/46* (2013.01); *Y10S 901/47* (2013.01)
USPC ................ 700/259; 318/567; 901/9; 901/31; 901/46; 901/47

(58) Field of Classification Search
USPC .......... 700/257–259, 245–250, 264; 318/567, 318/568.1, 568.2, 568.11, 568.12, 568.16, 318/568.25, 568.21
See application file for complete search history.

(56) References Cited

U.S. PATENT DOCUMENTS 4,117,605 A * 10/1978 Kurland et al. ............... 434/319
4,952,772 A    8/1990 Zana
(Continued)

FOREIGN PATENT DOCUMENTS

EP    0162565 A2    11/1985
EP    1537959 A2    6/2005
(Continued)

OTHER PUBLICATIONS

Science Daily "Robots Will Quickly Recognize and Respond to Human Gestures, With New Algorithms," (May 2012), available online at http://www.sciencedaily.com/releases/2012/05/120524134525.htm (last accessed on Jan. 11, 2013).
(Continued)

*Primary Examiner* — Dalena Tran
(74) *Attorney, Agent, or Firm* — Morgan, Lewis & Bockius LLP

(57) ABSTRACT

In accordance with various embodiments, a user interface embedded into a robot facilitates robot training via direct and intuitive physical interactions.

15 Claims, 9 Drawing Sheets

(51) Int. Cl.
| | |
|---|---|
| G05B 19/42 | (2006.01) |
| G06F 17/00 | (2006.01) |
| G06K 9/20 | (2006.01) |
| G06K 9/62 | (2006.01) |
| G06K 9/66 | (2006.01) |
| G06N 99/00 | (2010.01) |

(56) References Cited

U.S. PATENT DOCUMENTS

| | | |
|---|---|---|
| 5,268,837 A | 12/1993 | Saylor |
| 5,488,689 A | 1/1996 | Yamato et al. |
| 5,652,910 A | 7/1997 | Boutaud et al. |
| 5,739,660 A | 4/1998 | Gnann |
| 5,783,834 A | 7/1998 | Shatas |
| 5,938,710 A | 8/1999 | Lanza et al. |
| 6,353,814 B1 | 3/2002 | Weng |
| 6,363,301 B1 | 3/2002 | Tackett et al. |
| 6,438,842 B1 | 8/2002 | Raami |
| 6,484,083 B1 | 11/2002 | Hayward et al. |
| 6,760,645 B2 | 7/2004 | Kaplan et al. |
| 6,826,452 B1 | 11/2004 | Holland et al. |
| 6,941,192 B2 | 9/2005 | Tang et al. |
| 7,024,276 B2 | 4/2006 | Ito |
| 7,096,090 B1 | 8/2006 | Zweig |
| 7,152,050 B2 | 12/2006 | Aoyama et al. |
| 7,181,314 B2 | 2/2007 | Zhang et al. |
| 7,209,801 B2 | 4/2007 | Anfindsen et al. |
| 7,221,983 B2 | 5/2007 | Watanabe et al. |
| 7,236,618 B1 | 6/2007 | Chui et al. |
| 7,236,854 B2 | 6/2007 | Pretlove et al. |
| 7,289,884 B1 | 10/2007 | Takahashi et al. |
| 7,328,196 B2 | 2/2008 | Peters, II |
| 7,353,081 B2 | 4/2008 | Skourup et al. |
| 7,353,082 B2 | 4/2008 | Pretlove et al. |
| 7,413,565 B2 | 8/2008 | Wang et al. |
| 7,450,538 B2 | 11/2008 | Apneseth et al. |
| 7,626,569 B2 | 12/2009 | Lanier |
| 7,643,907 B2 | 1/2010 | Fuhlbrigge et al. |
| 7,646,161 B2 | 1/2010 | Albu-Schaffer et al. |
| 7,720,572 B2 * | 5/2010 | Ziegler et al. ........... 700/245 |
| 7,720,775 B2 | 5/2010 | Shimomura et al. |
| 7,826,984 B2 | 11/2010 | Sjostrand et al. |
| 7,848,565 B2 | 12/2010 | Goerick et al. |
| 7,852,355 B2 | 12/2010 | Friedrich et al. |
| 7,979,162 B2 | 7/2011 | Niemela et al. |
| 8,022,655 B2 | 9/2011 | Endresen et al. |
| 8,079,143 B2 | 12/2011 | Zhang et al. |
| 8,090,475 B2 | 1/2012 | Blanc et al. |
| 8,099,191 B2 | 1/2012 | Blanc et al. |
| 8,121,729 B2 | 2/2012 | Blanc et al. |
| 8,140,188 B2 | 3/2012 | Takemitsu et al. |
| 8,160,743 B2 | 4/2012 | Birkenbach et al. |
| 8,185,346 B2 | 5/2012 | Sjostrand et al. |
| 8,190,294 B2 | 5/2012 | Sjostrand et al. |
| 8,380,348 B2 | 2/2013 | Neki et al. |
| 8,588,972 B2 * | 11/2013 | Fung ........................ 700/245 |
| 8,639,644 B1 | 1/2014 | Hickman et al. |
| 8,731,276 B2 | 5/2014 | Mizutani et al. |
| 2001/0028339 A1 | 10/2001 | Tani |
| 2002/0050802 A1 | 5/2002 | Inoue et al. |
| 2002/0082498 A1 | 6/2002 | Wendt et al. |
| 2002/0164070 A1 | 11/2002 | Kuhner et al. |
| 2004/0172164 A1 | 9/2004 | Habibi et al. |
| 2004/0172168 A1 | 9/2004 | Watanabe et al. |
| 2005/0256611 A1 | 11/2005 | Pretlove et al. |
| 2006/0048364 A1 | 3/2006 | Zhang et al. |
| 2006/0178775 A1 | 8/2006 | Zhang et al. |
| 2007/0001638 A1 | 1/2007 | Gray et al. |
| 2007/0061041 A1 | 3/2007 | Zweig |
| 2007/0106421 A1 | 5/2007 | Kamrani et al. |
| 2007/0276538 A1 | 11/2007 | Kjellsson et al. |
| 2008/0028824 A1 | 2/2008 | Brogardh et al. |
| 2008/0065257 A1 | 3/2008 | He et al. |
| 2008/0091301 A1 | 4/2008 | Brantmark et al. |
| 2008/0134801 A1 | 6/2008 | Tseng et al. |
| 2008/0140321 A1 | 6/2008 | Blanc et al. |
| 2008/0147239 A1 * | 6/2008 | Chiang et al. ............ 700/264 |
| 2008/0161829 A1 | 7/2008 | Kang |
| 2008/0197710 A1 | 8/2008 | Kreitz et al. |
| 2008/0302200 A1 | 12/2008 | Tobey |
| 2009/0132088 A1 | 5/2009 | Taitler |
| 2009/0204261 A1 | 8/2009 | Strand et al. |
| 2009/0281659 A1 | 11/2009 | Wappling et al. |
| 2009/0306825 A1 | 12/2009 | Li et al. |
| 2010/0036525 A1 | 2/2010 | Casanelles et al. |
| 2010/0145509 A1 | 6/2010 | Zhang et al. |
| 2010/0184011 A1 | 7/2010 | Comerford et al. |
| 2010/0188034 A1 | 7/2010 | Young et al. |
| 2010/0236046 A1 | 9/2010 | Lundberg et al. |
| 2010/0241248 A1 | 9/2010 | Zhang et al. |
| 2010/0312391 A1 | 12/2010 | Choi et al. |
| 2010/0312392 A1 | 12/2010 | Zimmermann |
| 2011/0003640 A9 | 1/2011 | Ehrman |
| 2011/0015787 A1 | 1/2011 | Tsusaka |
| 2011/0046783 A1 | 2/2011 | Benchikh |
| 2011/0095457 A1 | 4/2011 | Sirkett et al. |
| 2011/0154934 A1 | 6/2011 | Skourup et al. |
| 2011/0178638 A1 | 7/2011 | Tsusaka et al. |
| 2011/0264266 A1 | 10/2011 | Kock |
| 2012/0011956 A1 | 1/2012 | Lundberg |
| 2012/0053728 A1 | 3/2012 | Theodorus et al. |
| 2012/0059516 A1 | 3/2012 | Lundberg et al. |
| 2012/0072023 A1 | 3/2012 | Ota |
| 2012/0116584 A1 | 5/2012 | Kim et al. |
| 2012/0130541 A1 | 5/2012 | Szalek |
| 2013/0343640 A1 | 12/2013 | Buehler et al. |
| 2013/0345863 A1 | 12/2013 | Linder et al. |
| 2013/0345869 A1 | 12/2013 | Chen et al. |
| 2013/0345870 A1 | 12/2013 | Buehler et al. |
| 2013/0345873 A1 | 12/2013 | Blumberg et al. |
| 2013/0345874 A1 | 12/2013 | Blumberg et al. |
| 2013/0345875 A1 | 12/2013 | Brooks et al. |
| 2013/0346348 A1 | 12/2013 | Buehler et al. |

FOREIGN PATENT DOCUMENTS

| | | |
|---|---|---|
| EP | 2210716 A2 | 7/2010 |
| EP | 2258521 A1 | 12/2010 |
| JP | 2008-257353 A | 10/2008 |
| JP | 2011-65652 A | 3/2011 |
| KR | 10-2011-0109413 A | 10/2011 |
| WO | 98/02825 A2 | 1/1998 |
| WO | 01/37060 A1 | 5/2001 |
| WO | 03/045640 A1 | 6/2003 |
| WO | 2009/018538 A2 | 2/2009 |
| WO | 2010/049101 A1 | 5/2010 |
| WO | 2010/122445 A1 | 10/2010 |
| WO | 2011/140704 A1 | 11/2011 |
| WO | WO-2011153156 A2 | 12/2011 |
| WO | WO-2012004017 A1 | 1/2012 |
| WO | WO-2012004232 A2 | 1/2012 |
| WO | WO-2012010332 A1 | 1/2012 |
| WO | 2012/020858 A1 | 2/2012 |
| WO | WO-2012027541 A1 | 3/2012 |
| WO | WO-2012031954 A1 | 3/2012 |
| WO | 2012/072023 A1 | 6/2012 |
| WO | 2013/192490 A2 | 12/2013 |
| WO | 2013/192492 A1 | 12/2013 |
| WO | 2013/192500 A2 | 12/2013 |
| WO | 2013/192490 A3 | 3/2014 |
| WO | 2013/192500 A3 | 4/2014 |

OTHER PUBLICATIONS

International Application Serial No. PCT/US2013/046973, International Search Report and Written Opinion mailed Feb. 5, 2014, 22 pages.

International Application Serial No. PCT/US2013/046973, Invitation to Pay Additional Fees and Partial Search Report mailed Oct. 11, 2013, 5 pages.

International Application Serial No. PCT/US2013/046977, International Search Report and Written Opinion mailed Oct. 31, 2013, 23 pages.

(56) References Cited

OTHER PUBLICATIONS

International Application Serial No. PCT/US2013/046996, Invitation to Pay Additional Fees and Partial Search Report mailed Oct. 18, 2013, 6 pages.

Arsenic, A. M., "Developmental Learning on a Humanoid Robot", Proceedings of IEEE International Joint Conference on Neural Networks, vol. 4, Jul. 25-29, 2004, pp. 3167-3172.

Azuma, Ronald T., "A Survey of Augmented Reality", In Presence: Teleoperators and Virtual Environments, vol. 6, No. 4, Aug. 1997, pp. 355-385.

Chen et al., "Gesture-Speech Based HMI for a Rehabilitation Robot", Proceedings of the IEEE Southeastcon '96, Bringing Together Education, Science and Technology, Apr. 11-14, 1996, pp. 29-36.

Feddema et al., "Model-Based Visual Feedback Control for a Hand-Eye Coordinated Robotic System", Journal Computer, Special Issue on Sharing: High Performance at Low Cost, vol. 25, No. 8, Aug. 1992, pp. 21-31.

Kragic et al., "Real-Time Tracking Meets Online Grasp Planning", Proceedings of The 2001 IEEE International Conference on Robotics and Automation. Seoul, South Korea, May 21-26, 2001, pp. 2460-2465.

Kulyukin Vladimir, "Human-Robot Interaction through Gesture-Free Spoken Dialogue", Autonomous Robots, vol. 16, No. 3, Kluwer Academic Publisher, May 2004, pp. 239-257.

Li et al., "Interactive Learning of Visually Symmetric Objects", IEEE/RSJ International Conference of Intelligent Robots and Systems, Oct. 10-15, 2009, pp. 4751-4756.

Miura et al., "Interactive Teaching of a Mobile Robot", Proceedings of the 2005 IEEE International Conference on Robotics and Automation, Apr. 18-22, 2005, pp. 3378-3383.

Nickel et al., "Visual Recognition of Pointing Gestures for Human—Robot Interaction", Image and Vision Computing, vol. 25, No. 12, 2007, pp. 1875-1884.

Sjo et al., "Object Localization using Bearing Only visual Detection", Proceedings of the 10th International Conference on Intelligent Autonomous Systems, Jul. 2008, pp. 254-263.

Thomaz et al., "Learning about Objects with Human Teachers", Proceedings of the 4th ACM/IEEE International Conference on Human Robot Interaction, 2009, pp. 15-22.

Wang et al., "Wavelet-Based Indoor Object Recognition Through Human Interaction", Proceedings of ICAR 2003 The 11th International Conference on Advanced Robotics, Coimbra, Portugal, Jun. 30-Jul. 3, 2003, pp. 959-964.

Witus et al., "Learning to See: Research in Training a Robot Vision System", Dec. 2008, 9 pages.

Belongie et al., "Shape Matching and Object Recognition Using Shape Contexts", IEEE Transactions on Pattern Analysis and Machine Intelligence, vol. 24, No. 24, Apr. 2002, pp. 509-522.

Iyer et al., "Shape-Based Searching for Product Lifecycle Applications", Computer-Aided Design, vol. 37, No. 13, Nov. 2005, pp. 1435-1446.

International Application Serial No. PCT/US2013/046996, International Search Report and Written Opinion mailed Mar. 3, 2014, 24 pages.

Communication Relating to the Results of the Partial International Search for International Application No. PCT/US2013/046996, mailed Oct. 18, 2013.

\* cited by examiner

USER INTERFACES FOR ROBOT TRAINING

CROSS-REFERENCE TO RELATED APPLICATIONS

This application claims priority to and the benefit of U.S. Provisional patent applications No. 61/662,646, filed on Jun. 21, 2012, and No. 61/676,586, filed on Jul. 27, 2012, the entire disclosures of which are hereby incorporated herein by reference.

FIELD OF THE INVENTION

The present invention relates, generally, to robot-user interaction and robot training. Various embodiments relate, more specifically, to user interfaces that facilitate direct physical interaction.

BACKGROUND

Industrial robots perform a variety of tasks involving precise and repetitive movements and manipulations of physical objects with no or only minimal human intervention. For example, robots are used to spray-paint automobile parts, weld pieces together, and assemble electronic devices. Robots may also be used to pick up objects at a particular location, transport them to a destination location, and put them down in accordance with particular coordinates e.g., stacking them or placing them into cardboard boxes present at the destination location. A typical industrial robot includes one or more arms with end-effectors designed for a specific tasks, and an associated computer-based controller.

Controllers for existing industrial robots are usually programmed in languages that specify exact positions and trajectories for the robot arm(s). During execution of a programmed task, the robot arm moves a reference coordinate associated with its most distal link to an exactly specified new position, following an exactly specified trajectory. The success of existing industrial robots is due to their operation in constrained environments, which allows the person programming the robot—who is usually involved in the process of structuring the robot's workspace—to predict, with high confidence, which objects will be present in the workspace at all times, and where they will be located. As a result, moving the reference point on the robot arm to particular coordinates, via particular trajectories, and then operating the end-effector (e.g., opening or closing a gripper of the robot), lead to real-world actions that achieve the specific task desired of the robot.

Programming conventional industrial robots generally demands a high level of technical expertise, and requires the user to think in terms understandable by the robot. For example, the programmer may use a six-dimensional vector to specify a reference point in three-dimensional space along with the orientation of the most distal link of the robot's arm. For a robot arm that has six or fewer degrees of freedom, that vector uniquely determines the settings for all the joints of the robot. If the robot arm has more than six degrees of freedom, further specification of the desired pose of the arm is required to remove any ambiguity.

Recent programming systems for industrial robots have user input layers that allow the programmer to circumvent the six-dimensional vectors by setting the end points of the trajectories by physically moving the arm to a desired pose and position and then causing the robot to record that position. In one approach, this is done by means of a remote, networked computer or an external teaching pendant (i.e., a handheld control terminal) that is plugged into the robot controller during a teaching phase. A teaching pendant usually includes an LCD screen, a joystick or similar steering device, one or more buttons, and sometimes a full keyboard (which may be a "soft" keyboard that pops up on a touch screen), which collectively allow the user to control and move the robot. Another technique involves equipping the most distal link of the robot arm with a load cell (optionally with a handle), and having the user switch the arm into a mode in which it responds to forces detected by the load cell, allowing the user to guide the robot arm to a desired position by hand. Typically, this requires, first, remotely switching the robot from an execution mode, in which it moves in accordance with previously programmed tasks, into a training mode, in which it is safe for the user to approach the robot. Second, the robot needs to be switched into guidable mode, where the user can freely move the robot arm around and record positions, e.g., by pushing a button on the teaching pendant.

Having taught the robot a position or trajectory in this manner, the programmer then provides explicit action commands to the robot. For example, if the task involves picking up an object, the programmer may need to specify the distance by which the robot has to lower its gripper, the width of the object or the requisite distance between the robot fingers for pick-up, and/or the force that the robot needs to apply to the object to hold it. This step, again, requires the programmer to break down even a task as simple as picking up an object into discrete steps, and supply precise parameter values for each step.

Once the robot has been properly programmed for a particular task, it can repeatedly and efficiently execute that task—but none other. Using the robot for a different task would essentially require re-programming it, which is a time-consuming and, thus, costly process. Similarly, any adjustments to the programmed task, such as a change in a pick-up or destination location, are cumbersome to implement as they would require overwriting previously entered parameters and/or repeating steps of the training process. Therefore, conventional industrial robots are typically designed and employed to perform highly specialized, value-adding tasks in a production process, where substantial investments in robot hardware and software are warranted by subsequent cost-savings through automation. More generic tasks that, though often monotonous to a human, have a degree of variability that renders their automation with conventional robots cost-ineffective, are usually left to human laborers.

Accordingly, there is a need for versatile robots that can easily and quickly be trained for new tasks, preferably without requiring special technical skills from the trainer.

SUMMARY

In various embodiments, the present invention provides robots that can be trained for a variety of tasks via intuitive, human-like interactions that do not require special technical expertise. Consequently, the robots can be integrated into production processes quickly and affordably. In some embodiments, the user interface is embedded in the robot and facilitates direct physical interaction between the robot and user, eliminating the need for an external teaching pendant or other remote control.

As part of its user interface, the robot may include touch pads, located in various places on its body, that allow it to detect and infer the location of a user based on touch, and turn towards the user in response. Further, the robot may have several conveniently located, identical sets of mechanical controls (called "navigators") that allow the user to change her position, without causing interruptions, during interactions with the robot. The robot may also mimic certain human behaviors to provide intuitively understandable cues regarding its internal state or the next action it intends to take. For example, a robot screen may display eyes that indicate by their gaze the direction in which the robot is about to move, or alert the user by means of a puzzled look that the robot requires further input.

The robot generally operates in a force-controlled mode that allows it to respond to any external forces quickly and in a manner that renders it safe for the user to approach the robot (even when the robot moves, e.g., to execute a task) in order to switch the robot into training mode. In some embodiments, the robot includes a wrist cuff on each of its arms that, when manipulated (e.g., grabbed) by the user, automatically switches the robot both into training mode as well as into a zero-force gravity-compensated mode that allows the user to guide the arm manually. The robot remains in this guidable mode until the user releases the cuff, and does not switch back into execution mode until it receives an explicit command to do so. The robot may be programmed and configured such that, once the user has brought the arm into a desired position, she can direct the robot to perform a particular action (e.g., close the gripper around an object) with the simple push of a button. In addition to serving as an input device during training, the robot arm may, when guided by the user, also provide haptic feedback to the user. For example, to avoid self-collision, the robot may exert increasing resistive forces as the user pushes the arm in a direction that would result in potentially harmful contact with another robot part. The arm, when held by the user, may also exert time-variable force patterns (or "haptic signatures") in response to certain conditions (such as, e.g., the proximity to a particular type of object) to thereby provide intuitive information to the user.

Due to their ease of use, user interfaces in accordance herewith pose a comparatively low barrier for training and re-training robots for new tasks, and, consequently, they can be deployed economically in many circumstances where conventional robots would be cost-prohibitive. Advantageous uses of robots according to various embodiments include, for example, the automated performance of simple tasks that are highly repetitive, monotonous, and often non-ergonomic (and, thus, generally unhealthy for a human to do).

In one aspect, the present invention is directed to a robot including a movable robot appendage having a cuff disposed at the distal end of the appendage (i.e., the free end away from the robot). The cuff includes a pressure-sensitive switch (e.g., including a flexible resistor or micro-push-button switch) and, disposed thereover around the cuff, a pressure-spreading layer (e.g., including or consisting essentially of flexible rubber) for transferring externally applied pressure to the switch. In some embodiments, the cuff also includes a plurality of pressable buttons on each of two opposing sides of the cuff. The buttons may be distinguishable by touch; for example, one button may be convex and the other concave, and/or one may be circular and the other circular. The robot further includes circuitry responsive to pressure applied to the switch when the cuff is grasped, which causes the robot to operate in a zero-force gravity-compensated mode in which the appendage moves substantially without resistance in response to forces applied to the cuff. In some embodiments, the robot is alternately operable in a training mode in which the robot learns and stores parameters relating to a task or an execution mode in which the robot executes a task in accordance with previously stored parameters; the circuitry may in this case, in response to pressure applied to the switch, also cause the robot to operate in training mode.

In another aspect, the invention is directed to a robot capable of direct interaction with a user. The robot includes a body with a torso and, attached thereto, a head and at least one appendage. Integrated into the robot body is a user interface including at least a visual display for conveying information to the user, one or more cameras for acquiring images of an environment of the robot, and one or more mechanical input devices responsive to at least one of touch or mechanical actuation. The robot further has a processor for processing input acquired by the user interface and, based thereon, controlling the appendage(s) and/or the visual display. The user interface may be configured to facilitate programming and/or training the robot (without requiring additional input devices external to the robot). The robot may also include a base with a portion that can be flipped and contributes different amounts to the height of the base, depending which side of the portion points up and which down.

In some embodiments, the visual display is configured to display, alternately or simultaneously in different portions of the display, an image captured by the camera(s), a graphical user interface, and/or computer graphics showing a facial expression. Via the facial expression, the robot may provide intuitive information to the user; for example, it may signal where it is going to move by the direction in which its eyes look. In some embodiments, the mechanical input device(s) include(s) multiple identical navigators (i.e., sets of mechanically actuated elements or other user controls), e.g., placed on two sides of the torso and on each of the appendages. The navigators may be configured collectively such that a series of user inputs provided via multiple of the navigators causes the same response as the series of user inputs provided via a single one of the navigators. In some embodiments, mechanical input devices are disposed in different locations on the robot, and the processor is configured to cause the robot to turn toward an estimated location of the user (e.g., by turning the visual display to face the user and/or moving one of the appendages toward the user) in response to user manipulation of one of the mechanical input devices and based on the location of the manipulated input device. The robot may, for example, include touch pads disposed on both shoulders, and/or wrist cuffs attached to the appendages at their distal ends.

In another aspect, the invention provides a robot, configured for interaction with a user, which includes a plurality of user input devices disposed in different locations on the robot, and a processor for causing the robot, in response to input provided via any of the user input devices and based on a location thereof, to turn toward an estimated location of the user.

In yet another aspect, the invention a robot (also configured for interaction with a user) that includes a robot body having a torso and a head and one or more appendages attached to the torso, a plurality of identical navigators for receiving input from a user, and a processor for processing the input and, based thereon, controlling an action of the appendage(s). The navigators are disposed in different locations on the robot, and are, collectively with the processor, configured such that a series of user inputs provided via multiple of the navigators causes the same action as the same series of user inputs provided via a single one of the navigators.

In a further aspect, a robot-user interaction method is provided. The method includes the step, following manipulation of a first one of multiple identical navigators disposed in different locations on the robot, of causing execution of an action in accordance with the manipulation of the first navigator, and the step, following subsequent manipulation of a second one of the identical navigators, of causing the robot to continue execution of the action in accordance with the manipulation of the second navigator.

Another aspect relates to a robot with one or more user-guidable robot appendages for manipulating objects (each of the appendages including one or more movable joints) and a haptics module for generating forces at the joint(s). The haptics module, which may be implemented in hardware (including the hardware ordinarily used to apply forces to the joints) and/or software, is configured to at least partially resist user-guiding of the at least one appendage within a specified spatial zone around other parts of the robot so as to prevent collisions between the appendage and the other parts of the robot. The forces generated by the haptics module may depend (linearly or non-linearly) on the distance between the appendage and the other parts of the robot, and/or on the direction or speed of motion of the appendage. In certain embodiments, the forces increase as the appendage moves closer to the other parts of the robot.

The invention also provides, in one aspect, a robot-implemented method for providing haptic feedback to a user guiding an appendage of the robot. The method involves, upon entry of the appendage into a specified spatial zone around other parts of the robot, at least partially resisting user-guiding of the appendage by generating a resistive force thereat so as to prevent collisions between the appendage and the other parts of the robot. The magnitude of the resistive force may depend on the distance of the appendage from the other parts of the robot and/or the direction or speed of motion of the appendage.

In a further aspect, various embodiments of the invention provide a robot having a user-guidable robot appendage including an end-effector for manipulating objects, a haptics module for generating forces at the end-effector, and a control system for monitoring a real or simulated environment for presence of one or more environmental conditions (e.g., the presence of the robot at a specified location or the presence of a specified object in a field of view of a robot camera) with respective associated haptic signatures. In response to detection of one of the environmental conditions, the control system causes the haptics module to generate a time-varying force in accordance with the haptic signature associated with the detected environmental condition. The robot may further include a training module configured to associate haptic signatures with respective environmental conditions.

In another aspect, the invention is directed to a robot-implemented method for providing haptic feedback to a user guiding an end-effector of the robot, which method involves generating, in response to the detection of a real or simulated condition, a time-varying force at the end-effector in accordance with a haptic signature associated with the detected condition.

BRIEF DESCRIPTION OF THE DRAWINGS

The foregoing will be more readily understood from the following detailed description of the invention, in particular, when taken in conjunction with the drawings, in which.

DETAILED DESCRIPTION

Robots in accordance with the present invention can generally operate in two modes: a training mode in which the robot learns via sensory and user input how to perform certain tasks, and a task-execution mode during which the robot autonomously carries out the tasks optionally based in part on the robot's perception of its environment via sensors, but without direct user interaction. Herein, the term "training" is used broadly, and is intended to encompass both dedicated training sessions that precede execution of the tasks for which the robot is being trained and interruptions of task execution in situations where further user information and/or feedback supplements previously received training (e.g., because the situation encountered was not anticipated during the training session).

Figure 1:
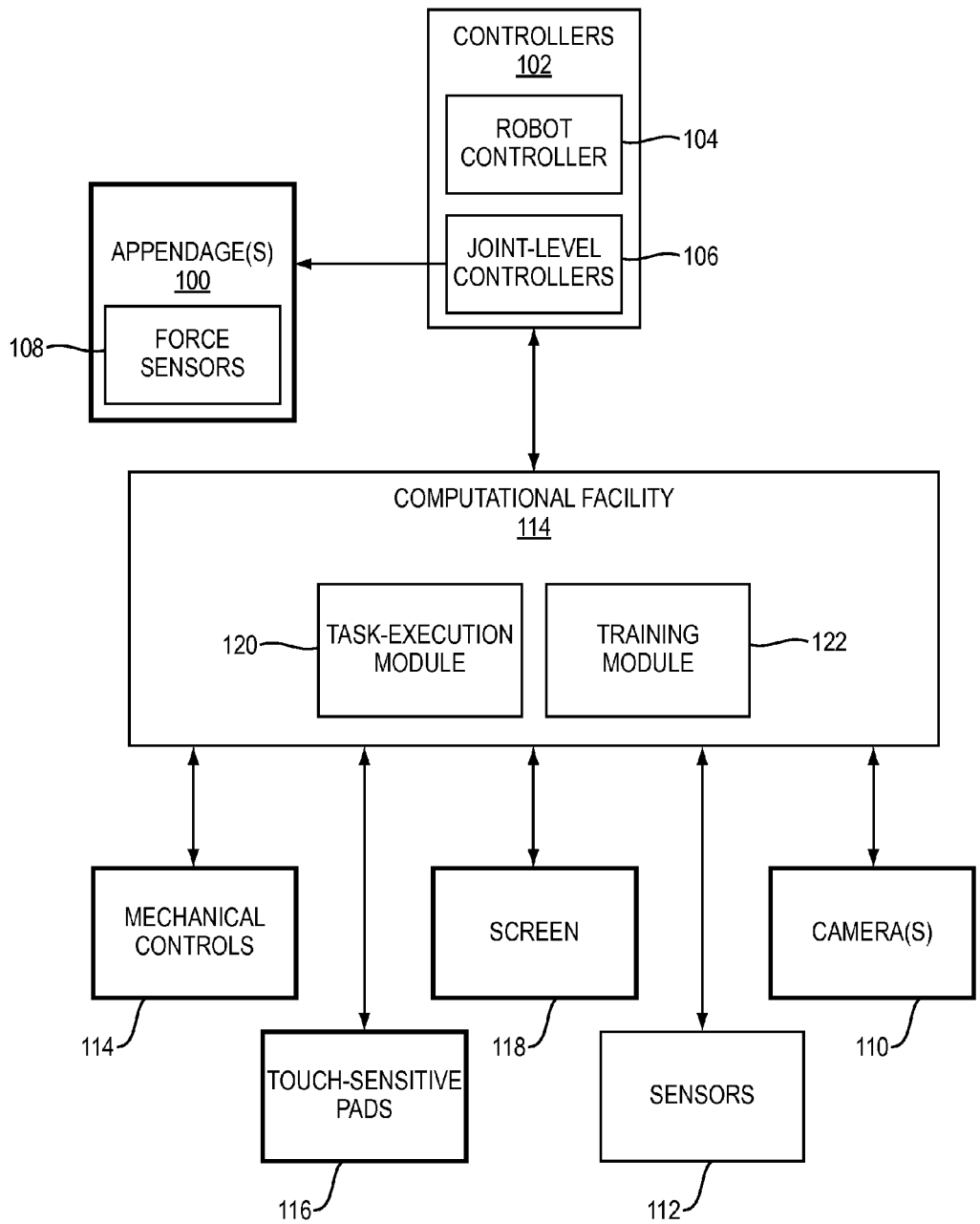
FIG. 1 is a block diagram illustrating a system in accordance with various embodiments.

In various embodiments, the present invention provides robot-user interfaces that facilitate robot training via direct interactions between the robot and the user. Some components of the interface are dedicated user input/output devices, whereas others have functions independent of user interactions, but secondarily serve as input and/or output devices in certain circumstances. FIG. 1 conceptually depicts the main functional system components of robots in accordance with various embodiments; components that are part of the user interface, i.e., facilitate information exchange with the user, are indicated by thicker outlines.

The robot includes one or more appendage(s) 100, typically including end-effectors such as parallel dual-finger grippers, suction cup grippers, or multi-fingered dexterous hands, for manipulating and moving objects or performing other useful work. The appendages 100 usually include multiple links connected via movable joints, such as hinges or rotary joints. Movement of the appendage(s) 100 is controlled by one or more controllers 102, which generally include a higher-level robot controller 104 that monitors and alters robot positions, kinematics, dynamics, and forces, and, in communication with and accepting commands from the high-level controller 104, one or more joint-level controllers 106 that drive the individual motors and actuators associated with the joints to move the appendage(s) 100 or other moving parts of the robot as directed. The appendage(s) 100 may also have one or more integrated force sensors 108 that measure forces applied externally to the appendage (e.g., by a user when he guides a robot arm).

The robot typically also includes one or more cameras 110, or other optical sensors, for visually perceiving its environment, both during training and during task-execution. Further, the robot may utilize other types of sensors 112, such as pressure sensors, temperature sensors, sonar sensors, accelerometers, gyroscopes, etc., to acquire information about its environment and/or its own state. For example, the robot may use a ring of sonar sensors to detect objects or people nearby, and accelerometers or gyroscopes to keep track of the locations and orientation of its body and appendages.

In addition to such general sensory input, the robot can also receive input from a user. For that purpose, it may include user-manipulable mechanical controls 114, such as buttons, dials, sliders, etc., touch-sensitive pads 116, and similar controls that allow a user to interact with the robot via direct physical contact. The robot appendage 100 itself may serve as such a mechanical input device if it is equipped to detect forces exerted and/or positional changes caused by the user. In certain implementations, the user may also provide visual input, e.g., by gesturing within the camera's field of view; thus, the camera(s) 110 may be part of the user interface. Finally, the robot may include traditional user input devices, such as mouse and keyboard, and/or audio input devices like microphones (not shown). To facilitate information flow in the reverse direction, from the robot to the user, the robot may have one or more visual output devices such as a screen 118 for displaying text and/or images, and/or audio output devices such as speakers. Furthermore, the appendage 100 may serve as an output device: as the user moves the appendage 100, e.g., holding an end-effector, he may experience haptic feedback, i.e., forces generated internally by the robot to either independently move the appendage 100 or resist movement by the user.

At the heart of the robot is a computational facility 114 that processes sensory and user input, and controls the robot's movements as well as information and signal flow to the output devices. The computational facility 114 may be embedded in the robot, or provided remotely and in communication with the robot via wired or wireless links. As explained in more detail below, the computational facility 114 may execute different program modules based on its mode of operation. For example, a task-execution module 120 may contain instructions for the autonomous performance of tasks by the robot based on sensory input, whereas a training module 122 may govern user interactions and robot learning. The task-execution and training modules 120, 122 may be linked by, and interact through, a set of shared data structures that are created and/or populated during the training phase and subsequently used during the task-execution phase. This way, the computational facility 114 and the user interface together may facilitate training the robot for specific tasks via intuitive, task-centered interactions. However, the various user-interface components described herein can also be used to train conventional industrial robots (e.g., by guiding an appendage of the robot along a desired trajectory that is recorded by the robot for later use), and need not be combined with the specific architecture described herein.

Figure 2A:
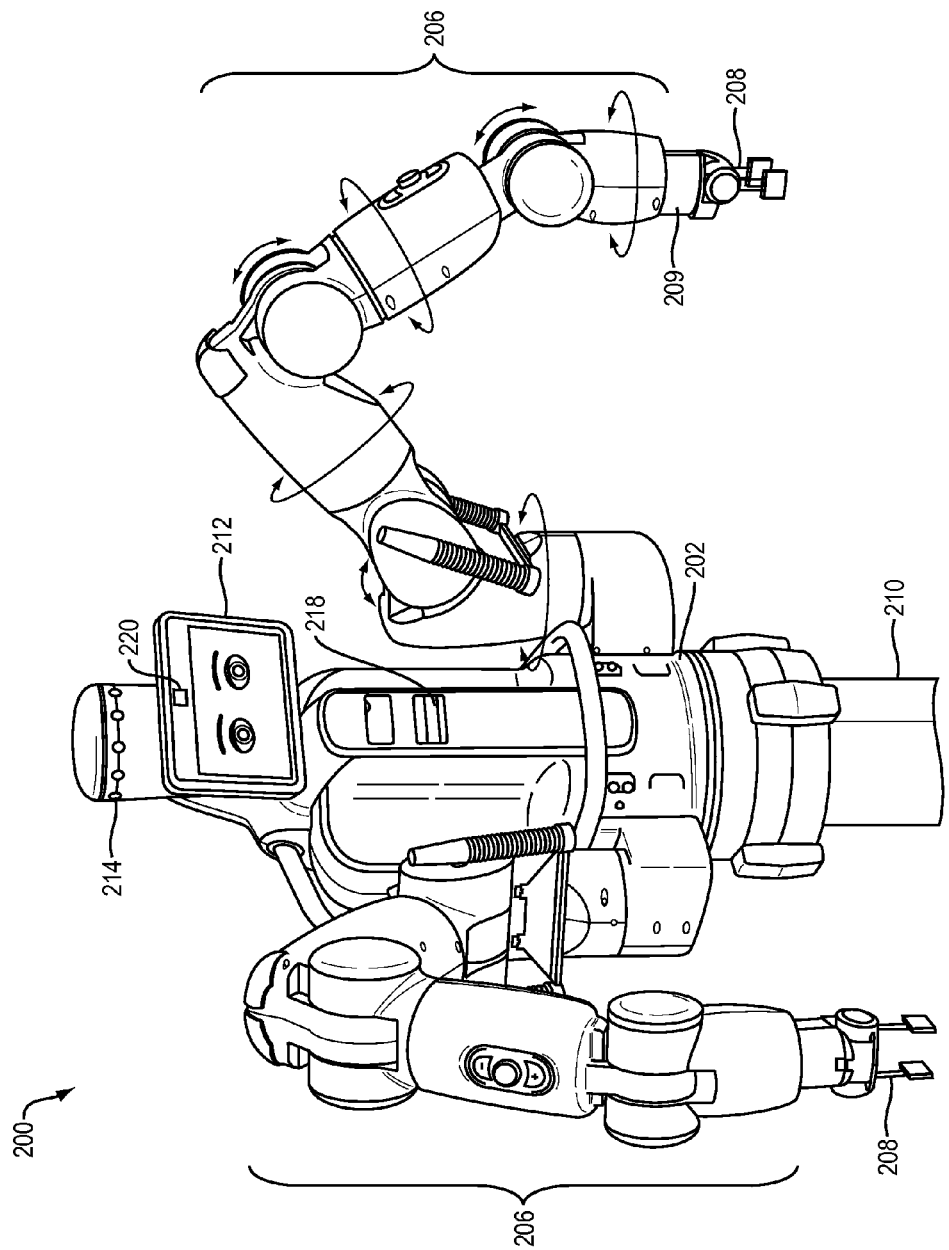
FIGS. 2A and 2B are perspective views of a robot in accordance with various embodiments.
Figure 2B:
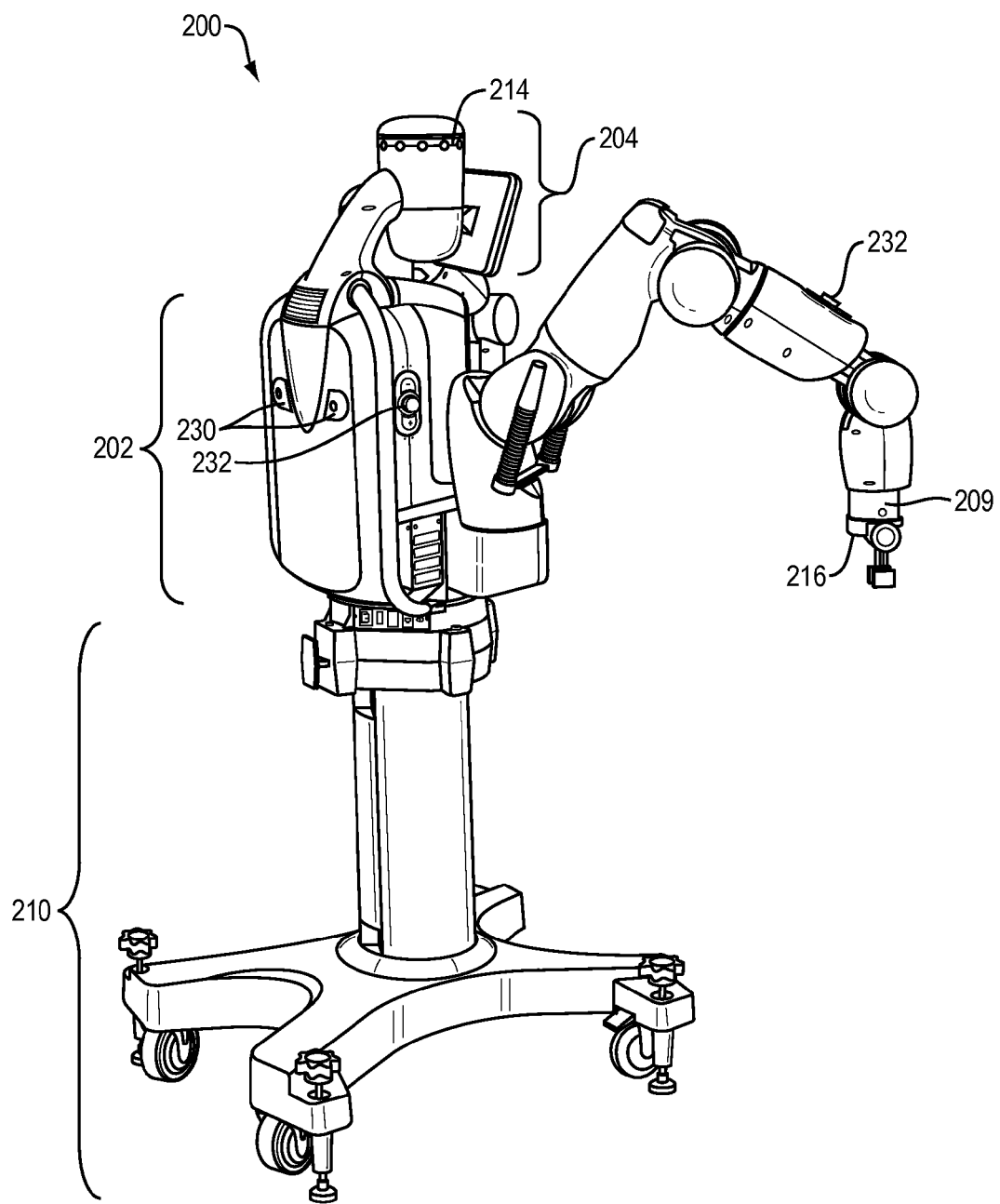
Figure 3B:
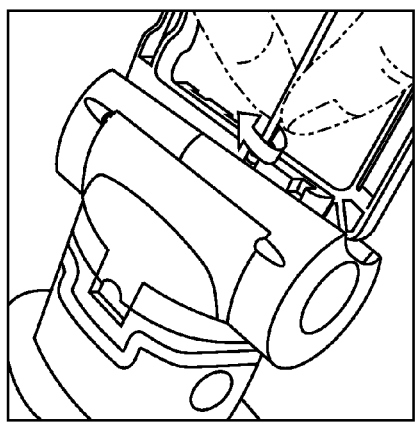
FIGS. 3A-3D are perspective views of a robot gripper in accordance with various embodiments.
Figure 3D:
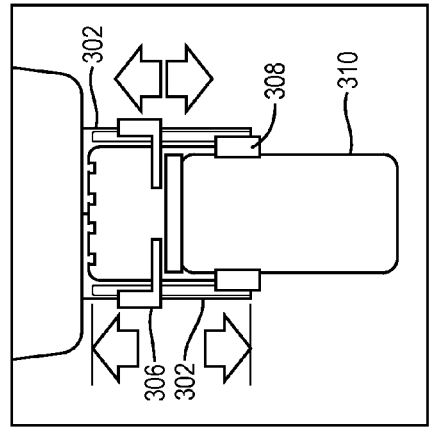
Figure 3A:
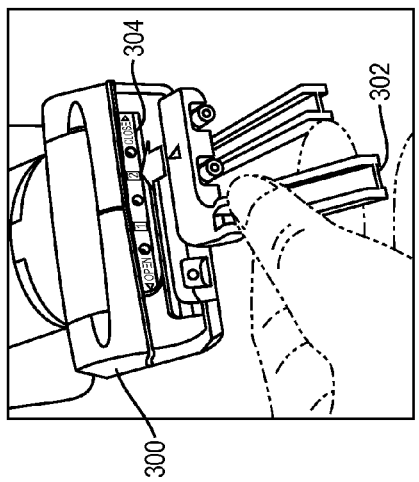
Figure 3C:
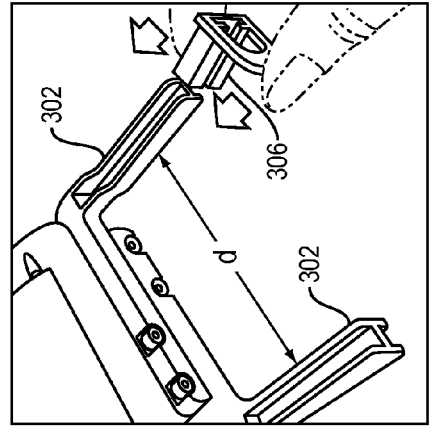

FIGS. 2A and 2B show a robot 200 in accordance with one exemplary embodiment hereof. The robot 200 has a humanoid appearance: it includes a body (or torso) 202, head 204, and two arms 206 with grippers 208 attached at their ends. Each arm includes seven links and a wrist 209 at its distal end. The links are connected to each other and the robot body 202 via seven joints that collectively provide seven degrees of freedom for the motion of the arm 206. As indicated by arrows in FIG. 2A, each joint either provides a hinge that allows an angle to vary between two links (i.e., allowing the links to rotate around an axis through the joint that is perpendicular to the axes of the links), or facilitates rotation of the more distal link around its axis. The robot 200 generally operates in force-control mode, not in position-control mode as many conventional industrial robots. In position-control mode, the robot arms receive commands to move (often very fast) to specified spatial coordinates, regardless of any external forces they may encounter on their trajectories, rendering it generally dangerous to enter the robot's workspace while the robot is moving. In force-control mode, by contrast, actuators apply specified forces to the joints. While the forces may be calculated to cause movement of the arm(s) to certain spatial locations and/or along certain trajectories, the planned motion will generally be interrupted when the robot experiences unexpected external forces. Thus, force-control mode enables, e.g., a collision detection behavior executed on the robot to halt motion in case of forces resulting from unexpected collisions. In the exemplary robot 200, series elastic actuators (SEAs) in the joints serve to apply forces as directed by the joint-level controllers 106, as well as to measure the forces at the joints for feedback control, collision detection, and to estimate any force applied to the wrist 209 of the arm 206 externally (e.g., by a user). SEAs are described in detail in, for example, U.S. Pat. No. 5,650,704, issued on Jul. 22, 1997, the entire disclosure of which is hereby incorporated herein by reference.

The robot's grippers 208 may be any end-effector(s) suited to robot operation in a particular application. In some embodiments they are mechanical grippers, e.g., each including two or more fingers extending parallel to each other from the wrist 209 and having a variable, mechanically adjustable distance from each other. Alternatively, the grippers 208 may be suction grippers connected via tubing to a unit within the robot that converts pressurized air from an external source connected to the unit into suction. Other types of grippers are also within the scope of the invention. The grippers 208 may be easily detachable from the arms 206 (or wrists 209) allowing the user to readily exchange them for other types of grippers or grippers of different dimensions. For example, in some embodiments, as illustrated in FIGS. 3A-3D, a generic finger transport mechanism 300, or simple hand, may be attached to the wrist, and then fingers 302 of varying shapes and sizes may simply be screwed (FIG. 3B) into slidable elements 304 of the hand 300 at one of multiple positions (see FIG. 3A) corresponding to different maximum finger separations, and their distance d thereafter adjusted via the slidable elements 304. The fingers 302 may be equipped with stops 306, grasp elements 308, or other parts that facilitate engaging with and picking up an object 310. The stops 306 serve to halt the gripper's downward motion once they contact the object 310, e.g., such that the fingers are aligned at a particular part of the object or such that contact between the "palm" of the hand 300 with the object 310 is prevented (e.g., to avoid scratching). The grasp elements 308 may come in different varieties and provide different grasp surfaces suitable for various materials, weights, etc. of the object 310.

Referring again to FIGS. 2A and 2B, the robot body 202 is mounted on a base 210, which may be fixed, rollable, or otherwise movable, depending on the needs of the particular application and environment in which the robot 200 is used. The vertical position of the robot's body 202 may be adjustable via different heights of the base 210. In some embodiments, the base 210 includes two parts that are vertically movable relative to each other, allowing the height to be adjusted continuously within a certain range. In other, simpler embodiments, illustrated in FIGS. 4A-4E, the base 210 has a fixed height when assembled, but includes a portion 400 that can be flipped horizontally and is shaped such that it adds different height to the base 210 depending on which surface points up and which down. This flippable portion 400 may be manufactured as a single molded piece, and adds little to the cost of the robot while accommodating two different working levels of the robot. The flippable portion 400 may be mounted onto a post 402. For example, as illustrated, the portion 400 may be slid over the post 402 and affixed to it with screws.

Figure 4A:
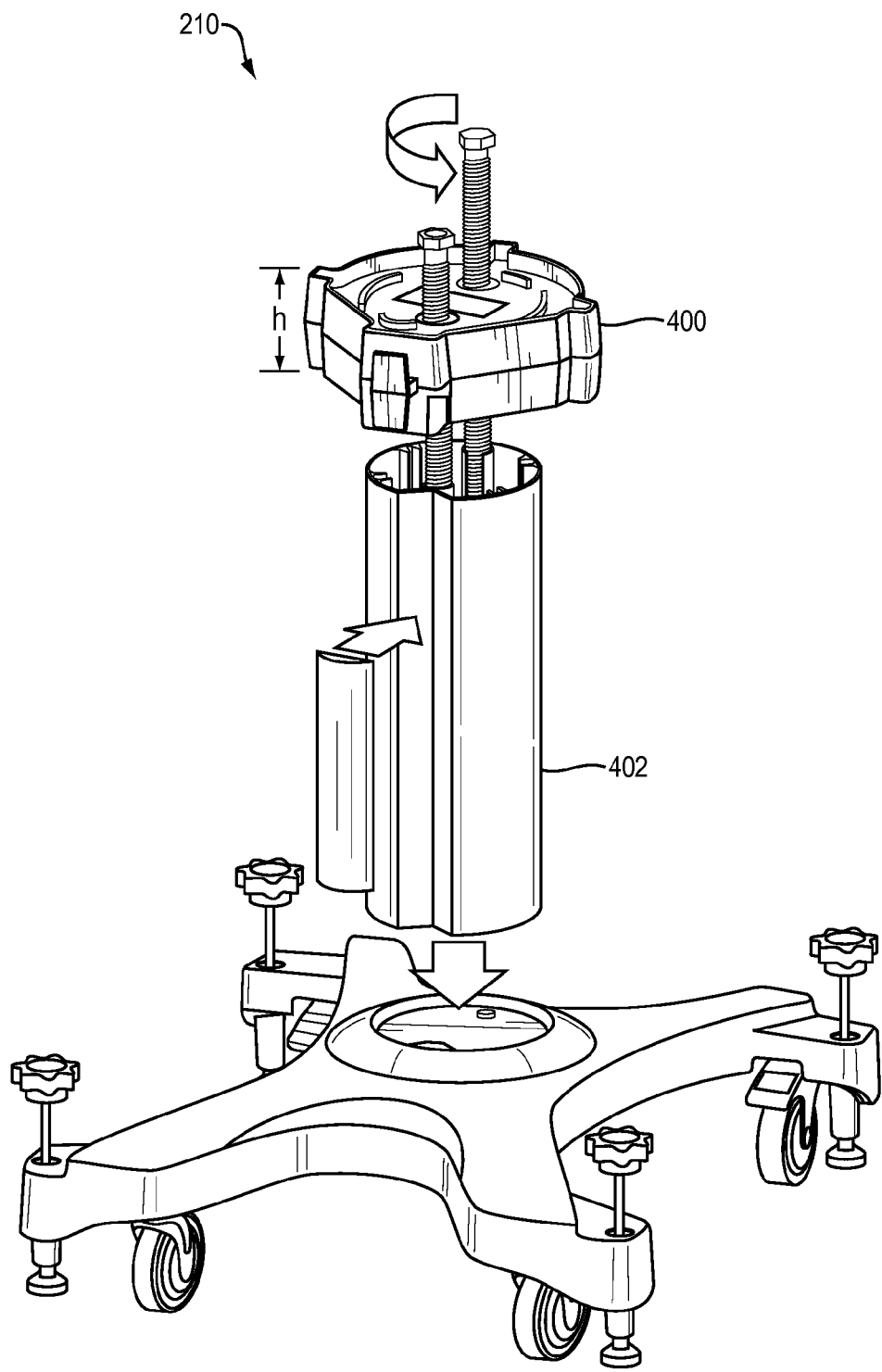
FIG. 4A is an exploded view of a robot base in accordance with various embodiments.
Figure 4C:
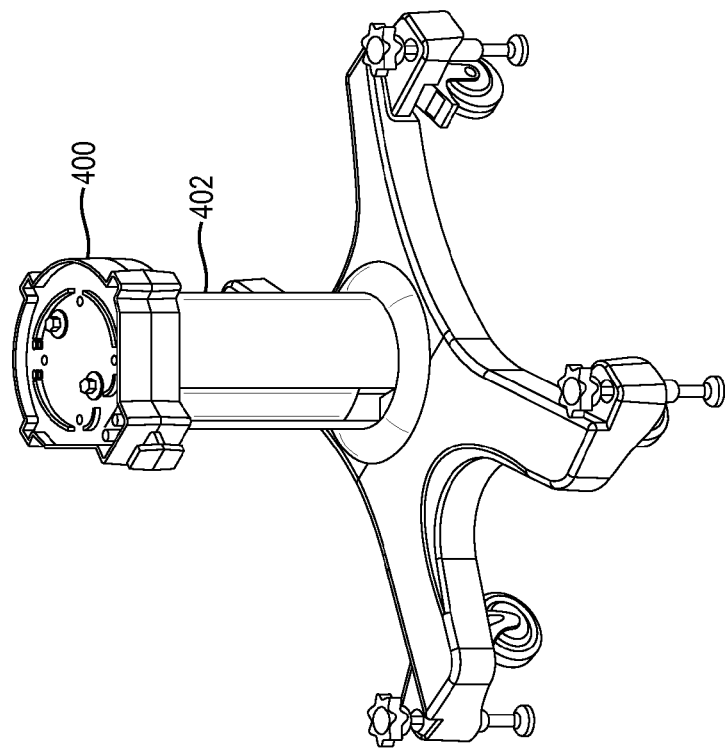
FIGS. 4B and 4C are perspective views of the robot base of FIG. 4A in two configurations in accordance with various embodiments.
Figure 4B:
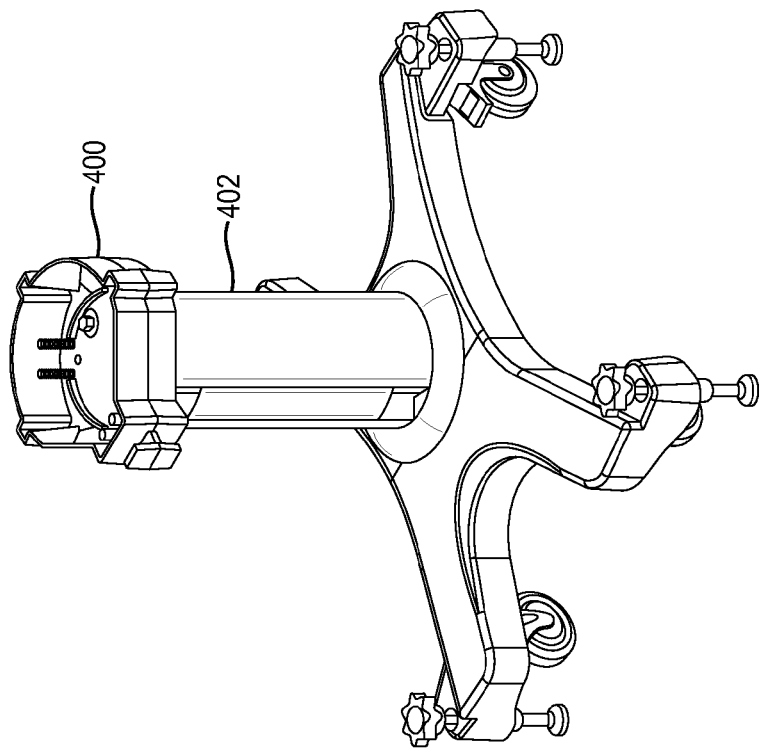
Figure 4D:
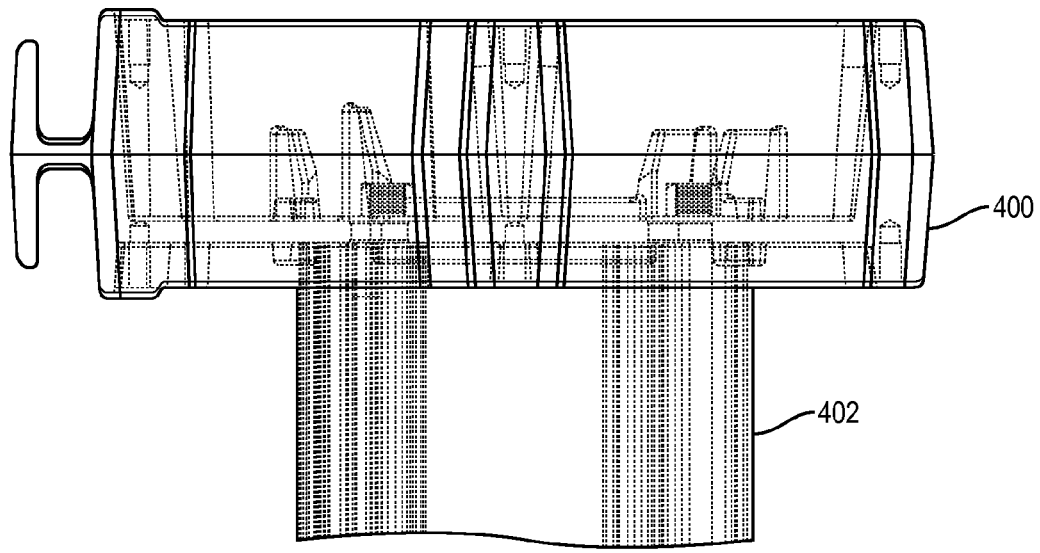
FIGS. 4D and 4E are transparent side views of the flippable portion of the robot base of FIG. 4A in two configurations in accordance with various embodiments.
Figure 4E:
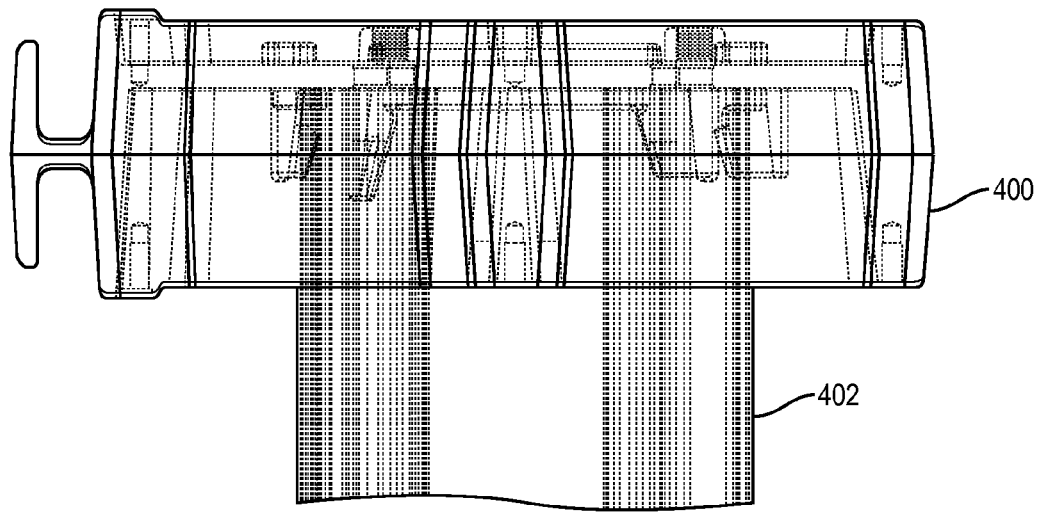

FIGS. 4B and 4C show the base 210 at the two heights corresponding to the two orientations of the flippable portion 400, and FIGS. 4D and 4E provide transparent close-up views of the flippable portion 400. In the high configuration (FIGS. 4B and 4D), the flippable portion 400 overlaps only slightly with the post 402, adding the larger part of its height h to the overall height of the base 210. In the low configuration (FIGS. 4C and 4D), the flippable portion 400 overlaps significantly with the post 402, adding only minimally, if at all, to the overall height of the base 210.

The robot's user interface may be wholly or partially embedded in the robot's body 202, head 204, and arms 206. In certain embodiments, all aspects of robot training can be accomplished via controls built into the robot, eliminating any need for external training pendants or remote controls. The user interface and the robot's behavior may mimic human behavior to a large extent, allowing a user without a high level of technical expertise to quickly familiarize himself with the robot 200, interact with the robot via simple physical interaction (e.g., by guiding the robot's arm), and interpret and/or anticipate its actions based on intuitive visual, haptic, or other cues. In addition, the robot 200 may include a more traditional user interface with menus, text entry fields, etc., that provide information about and allow manipulation of the robot's state in a language familiar to the technically versed user.

In the embodiment illustrated in FIGS. 2A and 2B, the robot has a screen 212 (e.g., an LCD screen) integrated into its head 204, which can rotate about a vertical axis and nod about a horizontal axis running parallel to the screen 212. The screen 212 sometimes displays a face, and sometimes text, menus, icons, spatial maps, and images from the robot's cameras, in various combinations. The robot 200 may choose what to display at any time based on its current mode, internal state, training stage, and/or particular triggers in its environment. When showing a face, the robot may convey information to a human trainer in a way that humans intuitively understand. For example, in response to user input that is incomplete, the robot may display a puzzled look to prompt the trainer to provide clarification; the robot may additionally provide auditory cues. The robot may also follow the user, or an object of interest, with its eyes, thereby signaling what it is currently focused on. Other types of screen displays may likewise facilitate communicating with the user in an intuitive manner. For example, the robot may send live video frames to the screen 212, overlaid with graphics that illustrate how the robot is interpreting what it "sees." In addition to the screen 212, the robot may include other visual indicators, such as, e.g., a ring of status lights 214 in its head 204 above the screen 212. The status lights may blink, change color, etc. to inform the user of the robot's state. For instance, the status lights may blink to indicate that the robot is awaiting further input, or change from yellow to red to visually alert the user of a danger or error condition.

The robot 200 includes five cameras. One camera 216 is located in each of the two wrists 209 so that the robot 200 can "see" objects it is about to pick up and adjust its grippers 208 accordingly. Further, the robot has two cameras 218, side by side, in its chest to provide a wide-angle view of the workspace and allow the robot 200 to visually detect equipment or objects to be manipulated. Finally, the robot 200 has a camera 220 above the screen 212; the camera 220 is oriented outwards to detect people in the environment. In some embodiments, the cameras—in addition to continuously monitoring the environment for people and objects—serve as a visual user input device. The user may, for example, point at an object of interest in the workspace, demonstrate how the robot should grasp the object, or make certain gestures the robot is programmed to recognize (such as "stop," "move to the left," etc.). The robot 200 may also include range sensors in each wrist, and a ring of sonar sensors in its head (e.g., integrated with the status lights 214) that are used to detect moving objects in the environment; see copending U.S. patent application Ser. No. 13/456,915, filed on Apr. 26, 2012 and hereby incorporated by reference.

In addition to these sensors for visually and/or acoustically detecting objects, the robot 200 may include a number of touch-sensitive sensors and mechanical features on its arms 206 and body 202 that facilitate mechanical interaction with a person (e.g., a trainer). For example, as illustrated in FIG. 2B, the robot 200 has two touch pads 230, symmetrically located on the robot's shoulders. By tapping either one of the touch pads 230, a user can get the robot's attention, even when she comes up behind the robot, and further indicate on which side she intends to stand when training the robot. The robot 200 may respond by turning its screen 212 towards the user and presenting one of its arms 206 on the user's side, allowing her to easily reach the gripper 208. Other physical user interaction elements on the robot's arms 206 and body 202 may, similarly, serve to inform the robot 200 of the user's location. For example, if the user guides one of the robot's arms by a touch-sensitive cuff around its wrist 209, the robot 200 assumes that the user is located in the direction in which the wrist 209 and gripper 208 are pointing. In general, the robot estimates where the trainer is standing based on the most recently touched interaction element, using a three-dimensional self-model that tracks where the interaction elements are. (Such three-dimensional self-models are well-known to persons of skill in the art. In brief, the robot continuously tracks the amount of rotation in each of its joints, and uses this information, along with a kinematic model of the relative positions of the joints, to compute the three-dimensional position and the three-dimensional orientation of each robot part.) This functionality enables the robot to orient its screen 212 to continuously face the user and follow the user around as she moves within the robot's workspace. Such capability is useful, for example, when the user, after moving around the robot to guide robot's arm 206 to a desired location, needs to view the screen 212: instead of stepping back to her previous location to view the screen 212, the user may simply tap a nearby touch pad 230, causing the robot to turn its screen 212 toward her.

Figure 5:
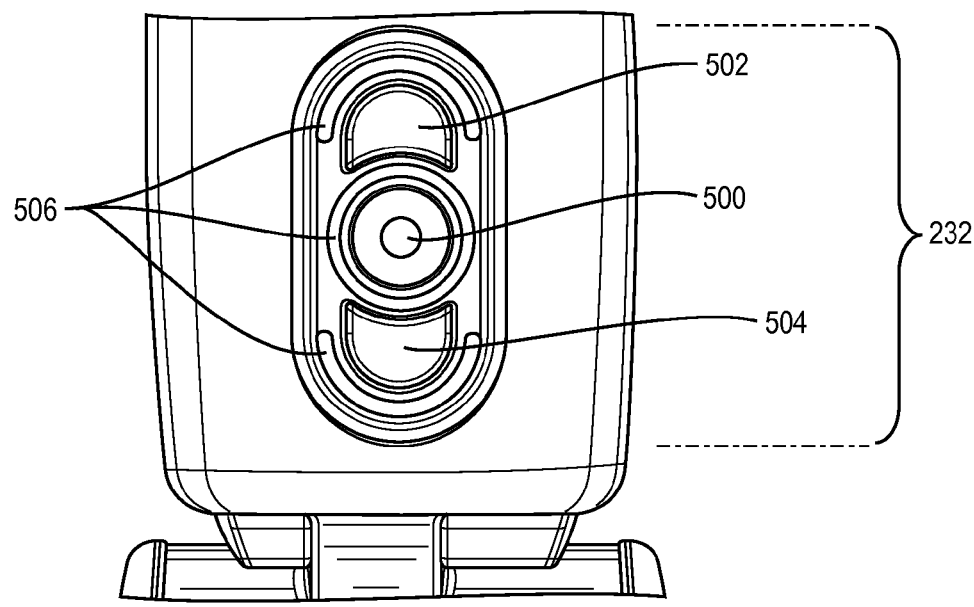
FIG. 5 is a perspective view of a navigator in accordance with various embodiments.

To further increase user convenience during interactions with the robot and allow the user to freely change her position relative to the robot, even in mid-interaction, the robot 200 may have multiple copies of one or more types of interaction elements in different locations on the robot. For example, the illustrated robot 200 includes four identical sets 232 of mechanical controls (each set collectively called a "navigator") on its arms, chest, and back, at least one of which is accessible, regardless whether the user stands in front of, behind, or to the side of the robot. As illustrated in FIG. 5, each navigator 232 may include, for example, a central knob 500 and two buttons 502, 504, above and below the knob 500. The upper and lower buttons 502, 504 may have different meanings and uses, and these may be varied and re-assigned by the designer or, in some embodiments, by the user. The central knob 500 may be a continuous digital knob with push capability. The navigators 232 allow the user to respond to information displayed on the screen 212 (e.g., by selecting menu items, switching between training and execution mode) and enter numbers (e.g., to indicate in how many rows and columns objects are to be packed in a box) or text (e.g., passwords or object and task names) via the digital knob 500.

In some embodiments, the functions of the knob 500 and/or buttons 502, 504 are context-dependent, i.e., they change depending on the training stage, the input required by the robot, etc. For example, one of the buttons may initially serve to switch the robot into training mode, and later be used to answer a question posed by the robot (and, for instance, displayed on the screen) in the affirmative, while the other button may be used to answer in the negative. The navigators may also include light elements 506 (for example, blue lights arcing around the top and bottom buttons, and a white light surrounding the central knob), which turn on under certain conditions during training, and may provide an indication of the present function of the buttons and knob. Of course, the specific navigator embodiment described herein is only one example of a set of mechanical control elements; many other combinations and configurations of one or more control elements and indicator features are conceivable and within the scope of the present invention.

At any given time, all of the navigators 232 have the same function. Thus, the trainer can use any of them for robot training, and can switch to another one at any time simply by using it. The robot 200 responds to user input provided sequentially via two or more of the navigators 232 in the same manner as it would respond to the same input if provided via a single one of the navigators 232, even if the pieces of input belong to a single transaction. This can be useful, for example, when the user, while training the robot from the front on the appearance of an object, realizes that he is in the way of the lighting, and therefore walks around behind the robot to complete the training using one of the navigators on the side of the robot. As another example, if the user, having trained the robot to lift an object using a navigator on the arm, moves the robot arm out to his own arm's reach, he may not be able to see the navigator any more since it is now on top of the robot arm, and therefore switch to a navigator on the side of the body. The two cuffs around the wrists 209 (described further below) may, similarly, be configured and function in the same way, allowing the user to switch between the left and right robot arms 206 as is convenient. Multiple identical navigators 232, wrist cuffs, or other user interaction elements thus facilitate seamless interactions while providing the user with great flexibility to choose her position relative to the robot 200.

When training the robot 200, the user often guides the robot's arm 206 to a desired position and/or adjusts the gripper 208. For example, the user may show the robot how to grasp an object with a mechanical gripper including two fingers by positioning the gripper around the object, with one finger to each side of the object, and then pushing the fingers toward each other until they contact the object or, alternatively, simply pushing a button to cause the gripper to close until it experiences a resistive force from the object. To facilitate such direct mechanical interaction and user-guidance of the arm 206, the arm 206 may have a wrist cuff designed to be grasped by the user, optionally with buttons or other mechanical controls.

Figure 6:
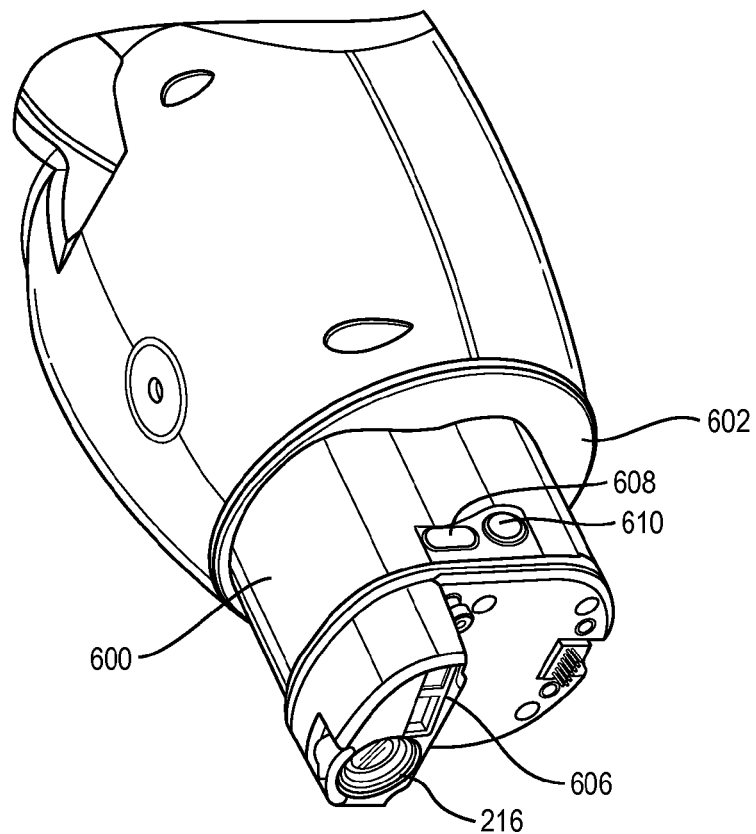
FIG. 6 is a perspective view of a wrist cuff in accordance with various embodiments.

In one embodiment, as shown in FIG. 6, the wrist cuff 600 forms a band around the wrist 209, right below a circular plate 602 that marks the end of the arm 206. Below the cuff 600, a camera 216 and range finder 606 are built into the wrist 209. The cuff 600 is designed to be grasped from the left or the right, in either case with the thumb on one side and the index and middle fingers on the other side. The cuff 600 may have two buttons 608, 610 on each side, located so as to be conveniently operable by the user's middle finger. The buttons may 608, 610 be designed to be recognizably distinct from touch; for example, one button may have a convex elongated shape while the other one may have a concave circular shape. In the illustrated embodiment, the circular button 610 is more distal for a right-handed grasp, and the elongated button 608 is more distal for a left-handed grasp, regardless from which side the cuff 600 is grasped. When the cuff 600 is grasped in the natural way (i.e., as intended), the user's thumb and index finger are above these two buttons 608, 610.

The cuff 600 has integrated touch or pressure sensors, such as, e.g., one or more flexible resistors or push-button switches, that (in conjunction with software executed on the robot) can detect when a user grasps it. The cuff 600 may be covered with flexible rubber that spreads the pressure so that simply grabbing the cuff activates the switch. The sensors and the control program may be configured to distinguish a deliberate grasp from an accidental physical contact with the wrist. Triggering conditions for activation of the switch may include, for example, that pressure is exerted on both sides of the wrist (as it is when the cuff 600 is grasped with the thumb and index finger), exceeds a specified threshold value, or persists for a specified time. With such conditions in place, contact that does not amount to a grasp, such as an accidental brief stroke, will generally not activate the switch.

In various embodiments, the computational facility 114 causes the robot to automatically switch into zero-force gravity-compensated mode when a user grabs the arm 206 by the wrist cuff 600. (Operating the robot in force-control mode renders it feasible and safe for the user to grab the arm 206 at any time, including in mid-motion, because the arm 206 can immediately respond to the unexpected force, even before the cuff is activated.) In zero-force gravity-compensated mode, the robot controller 104 operates the robot arm so as to act like a set of links with low-friction bearings at each joint while compensating for gravity so that the arm does not drop to the lowest possible configuration (but instead acts as if it were in outer space). To accomplish gravity compensation, the controller 104 takes account of the instantaneous kinematic configuration of the robot, based on a detailed internally stored, digitally represented model of the robot's mass distribution, and applies torques to each joint to counteract gravity for all links distal to that joint. Further, the robot relies on the SEAs in each joint to estimate the force applied to the wrist 600 by the user; that is, sensors in the SEAs measure the forces at the joints, and the robot controller 104 and/or computational facility 114 then use a kinematic model of the arm with a model of the mass distribution in each link to subtract out the force due to gravity. The remaining force on each link results from the force applied by the user to the wrist 600. The robot controller 104 tries to make each of these remaining forces zero, thus causing the robot to follow this user-applied force, providing nearly zero-force push-back regardless how the user pushes on the endpoint of the arm 206. In other words, owing to the responsiveness of the robot controller 104 to applied force as long as the wrist cuff 600 is held by the trainer, the arm 206 moves freely in response even to small forces, impeded merely by its inertia. Thus, the user may easily move the arm 206 from place to place, e.g., for training purposes.

In some embodiments, grabbing the wrist cuff 600 causes the robot 200 to switch not only into zero-force gravity-compensated mode, but also into training mode, where the robot 200 awaits and responds to input from the user. The robot 200 will generally remain in training mode, regardless whether the user holds on to the cuff 600, until it receives an explicit command (e.g., via pushing of a button) to return to execution mode. The two buttons 608, 610 on the wrist cuff 600 can be used in the training process, for example, to map out areas by clicking one of the buttons at distinct points (e.g., the vertices of a polygon), to confirm correct visual selection of an object, or to manually cause the gripper to open or close.

In some embodiments, the robot's arms 206 serve simultaneously as user input and output devices during training: while the user guides the arm 206 to show the robot 200 a particular trajectory or position, the arm 206 may provide haptic feedback to the user. For example, the robot 200 may be configured to detect impending self-collisions of its arm(s) with other parts of its body (such as its screen 212), and resist movement of its arms in a manner that would result in such a collision. Thus, if a user guides a robot arm 206, perhaps inattentively, so that a collision becomes likely, he will feel push-back from the robot that starkly contrasts with the zero force he would ordinarily feel and, thus, alerts him of the problem. The resistive force exerted by the robot (and effected, via the relevant joints, by commands sent thereto by robot controller 104) to avert self-collisions may be triggered once the robot's gripper, or another relevant point along the robot's arm, comes within a threshold distance of (i.e., a "protective zone" around) the other robot parts. The robot 200 may detect entry of the robot's arm 206 into the protective zone based on its three-dimensional self-model, which continuously tracks the position, orientation, and velocity of all robot parts computationally, using the robot's knowledge of the forces applied at the joints. Alternatively or additionally, the arm 206 may be equipped with suitable sensors (e.g., the range sensors 606 mounted into its wrist 600) that allow direct distance measurements. The resistive force generated by the robot may increase as the distance of the arm from other robot parts decreases. Further, it may depend on the velocity (i.e., the speed and direction) with which the robot appendage moves. For example, if the arm moves fast toward another robot part, the resistive force may be larger, whereas, if the arm moves at a lower speed and/or in a direction substantially parallel to the surface of the other robot part, the resistive force can be smaller.

The robot 200 is generally strong enough to stop an ordinary person from causing a collision (whether inadvertently or intentionally). For instance, a person cannot cause the robot 200 to poke itself in its eye (i.e., the LCD screen 212) with its finger(s). In fact, in some embodiments, the screen 212 is surrounded by a virtual protective sphere whose extent the user can feel by sliding the fingers over it and feeling where the resistive forces start. Likewise, if the user is trying to move the gripper 208 to a place in the workspace where it would cause the robot's elbow to collide with the body, he can feel a resistive force centered around the elbow. To provide a further example, in embodiments that allow a user to simultaneously guide two arms in zero-force mode, the user cannot make them collide with each other. The resistive forces felt by the right arm depend on the location of the left arm and vice versa; each arm is, thus, effectively surrounded by a force field that moves about in space as the arm moves. This force field is implemented by commands sent by controller 104 to the appropriate joint-level controllers 106 in response to the sensed conditions as described above.

Haptic feedback may also be used to "annotate" certain places, objects, or robot actions with different "special effects" or "haptic signatures," i.e., distinct time-variable force patterns, such as a series of clicks, or forces simulating movement over a rumble strip or across sandpaper. Typically, a haptic signature involves robot-generated forces that are significantly smaller in magnitude (e.g., by an order of magnitude or more) and vary at much higher rates than the forces externally applied by the user when guiding the arm; thus, the haptic signature provides haptic cues to the user without interfering with the overall motion of the arm.

Haptic signatures may be associated, for example, with certain locations in space, and provide intuitive information to the user as she guides the arm 206 around. For example, to aid the user in centering the robot's gripper above a conveyor belt, the robot may signal the correct position by giving the user the feeling of moving across sandpaper (without there being any physical contact between the robot's gripper and the conveyor belt). Haptic signatures may also be used to remind the user of the types of actions trained at certain locations. For example, when the arm is moved over a put-down location, it may give the user a sandpaper feel of a particular roughness, and when it is moved over a pick-up location, it may jiggle up and down a little bit. Alternatively, when the pick-up location corresponds to an extended arc (rather than a point), that area may likewise be annotated with a sandpaper feel, but at a different roughness than that associated with the put-down area. To provide yet another example, when the arm is brought over a conveyor belt, it may retain zero force in the direction of a two-dimensional vector aligned with the conveyor, but require a little force to push it sideways relative to the conveyor and exit from that area. Haptic signatures may also facilitate training. For example, when the user returns the robot arm to a previous location, the arm may, as soon as it is in the vicinity of that location, "snap to" the location (similarly as file icons snap to folders on a computer desktop), i.e., the robot may apply a little force to move the arm to the location—while still allowing the user to push back against the force if she wants to move to a different place.

In general, any environmental condition associated with a particular location and detectable by the robot—whether it be the location itself, the presence of a particular piece of equipment or type of object at that location, motion or other action taking place at the location, or a measurable parameter of the location (e.g., a height, pressure, etc.)—can be used to trigger a particular haptic signature when the robot's arm or gripper reaches the location, thus providing information to the user that correlates directly with her guidance of the arm. Furthermore, a haptic signature may indicate an environmental condition or state of the robot that is unrelated to the arm's location. For example, the robot may signal to the user, via a haptic signature, when it detects a certain object in its field of view. Such feedback may be a useful supplement to other channels of communication (such as the LCD screen 212) when the user is preoccupied with guiding the robot's arm 206.

Furthermore, haptic signatures may be used to simulate an environment and, thus, allow the user to train the robot even in the absence of the objects, equipment, etc. to which the training pertains. For example, to train the robot to put down (actual) objects on a virtual conveyor belt, the user may guide the robot through the motions of that task without having the conveyor belt there during training, but relying, instead, on haptic signatures indicating when the object would be above the conveyor belt (e.g., by giving the user a sandpaper feel) or when the object would contact the conveyor belt (e.g., by exerting slight haptic push-back). The robot, in other words, maintains internal canonical representations of different environments—here, a conveyor belt—including the spatial locations of items normally found in these environments, as well as physical characteristics of the items. At least some of these physical characteristics (e.g., surface texture) are translated into haptic signatures by the computational facility 114, and which are experienced by the user operating the robot in the selected virtual environment. In some embodiments, characteristics of the environment may be altered (from the default values) by the user via the user interface.

To provide haptic feedback to the user, the robot may utilize the same hardware components as are employed to operate the robot arm 206 during the performance of useful work—such as the force-generating motors or actuators at the joints and the joint-level controllers 106 and robot controller 104 that drive them—in conjunction with a software haptics module that computes the desired haptic forces (based on data received, e.g., from a self-collision detection module or a module monitoring environmental conditions) and provides appropriate commands to the controllers. Alternatively or additionally, haptic feedback, in particular, the haptic signatures, may be enabled by dedicated haptics hardware, such as low-force actuators and associated controllers integrated into the robot's wrist 600 and/or filters that modulate motion of the gripper in accordance with the signature via the relevant joint-level controllers 106.

The robot 200 described above is, of course, only one of many possible robot embodiments in accordance with the invention. Various components and features can be modified in manners that will be readily apparent to persons of skill in the art. For example, the robot may, generally, have any number of arms (or, more generally, appendages), and each arm may have any number of degrees of freedom. The links of the arms need not be joined by joints providing only one rotational degree of freedom, but may, for example, include ball-and-socket joints that provide two rotational degrees of freedom and/or rail systems that facilitate translational motion. Further, instead of or in addition to grippers, the robot may have other types of end-effectors, e.g., tools (such as a drill, saw, etc.) or measuring devices (such as e.g., scales, gauges, etc.). Furthermore, some of the user interface components described above may be installed in different locations, or modified in their structural and functional details. Of course, the various user interface components need not all be used in each embodiment. Further, additional types of input and output devices may be used to supplement the user-interaction capabilities of the robot. For example, the robot may include a speaker and/or microphone for audio communication.

As indicated with reference to FIG. 1, information exchange among the robot controller(s), sensors, and user interface is facilitated and directed by a computational facility 114. The computational facility 114 may employ a general-purpose computer, or any of a variety of other processing devices, including, without limitation, special-purpose computers, microcontrollers, application-specific integrated circuits (ASICs), field-programmable gate arrays (FPGAs), digital signal processors (DSPs), or programmable gate arrays (PGAs). In various embodiments, combinations of multiple different processing devices are used. Furthermore, in some embodiments, the overall control functionality is distributed between components physically integrated into the robot, and external components in communication with the robot.

Figure 7:
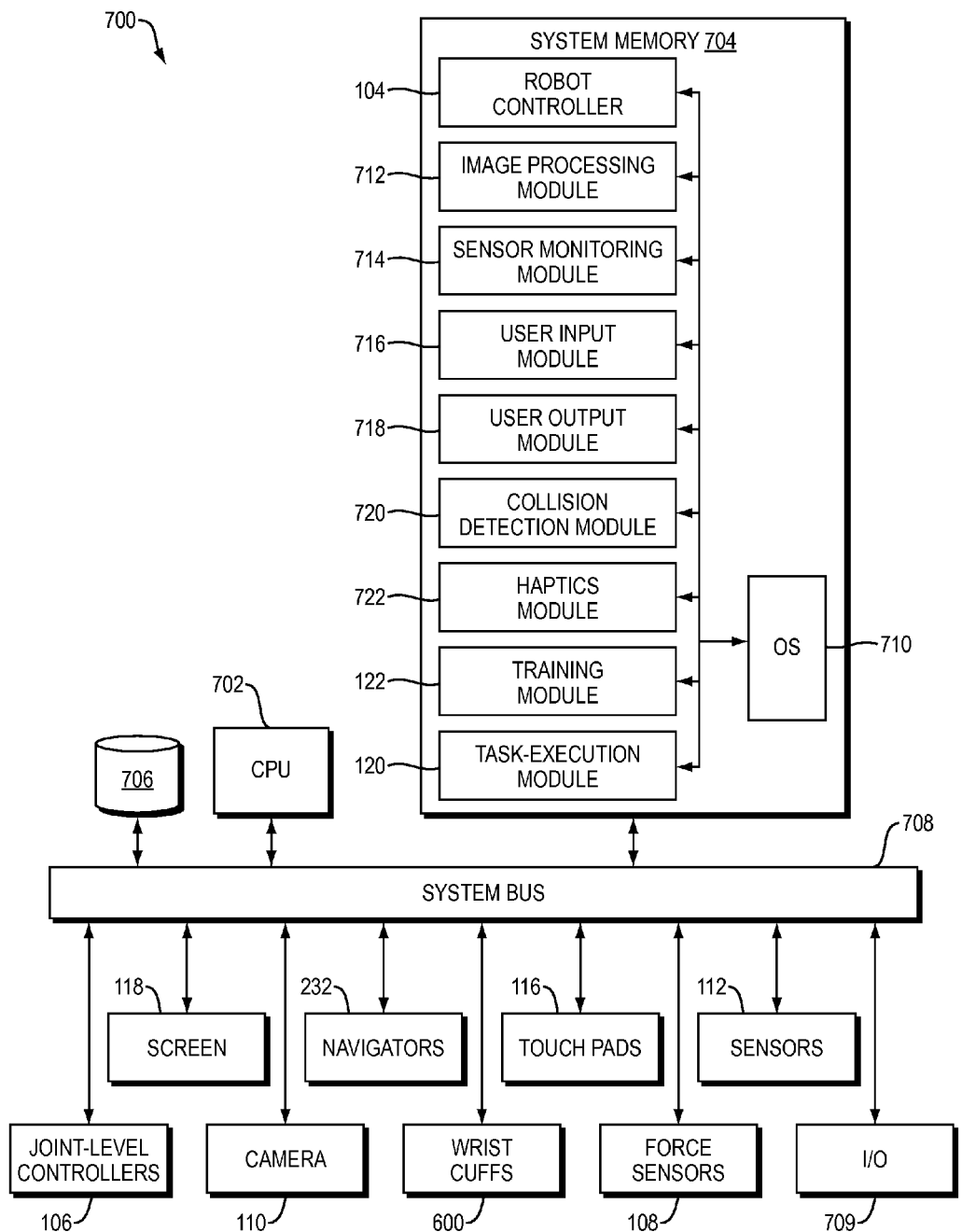
FIG. 7 is a block diagram illustrating an implementation of the computational and control functionality of a robot in accordance with various embodiments.

FIG. 7 illustrates an exemplary implementation of the computational facility 114 implemented on a general-purpose computer 700 including a central processing unit (CPU) 702 (e.g., a quad-core Intel processor), system memory 704, and non-volatile mass storage devices (such as one or more hard disks and/or optical storage units) 706. The computer 700 further includes a bidirectional system bus 708 over which the CPU 702, memory 704, and storage devices 706 communicate with each other as well as with internal or external input/output devices such as the joint-level controllers 106 (which may, e.g., be ARM processors), screen 118, cameras 110, navigators 232, wrist cuffs 600, touch pads 116, force sensors 108, other types of sensors 112, and/or traditional input devices (e.g., a keyboard or a mouse) 709.

The system memory 704 contains instructions, conceptually illustrated as a group of modules, that control the operation of CPU 702 and its interaction with the other hardware components. The various modules may be programmed in any suitable programming language, including, without limitation, high-level languages such as C, C++, C#, Ada, Basic, Cobra, Fortran, Java, Lisp, Perl, Python, Ruby, or Object Pascal, or low-level assembly languages; in some embodiments, different modules are programmed in different languages. The modules may include an operating system 710 (e.g., Gentoo Linux) that directs the execution of low-level, basic system functions such as memory allocation, file management and operation of mass storage devices 706. At a higher level, one or more service applications may implement the robot controller 104, an image-processing module 712 for analyzing the camera images, a sensor-monitoring module 714 for reading sensor values (including those of the force sensors 708 at the joints) and checking their consistency and/or plausibility, a user-input module 516 for interpreting user input via the various mechanical control elements and switching between training and execution mode, a user-output module 718 for controlling the LCD screen and various indicator lights, a collision and self-collision detection module 720, a haptics module 722 for computing the force feedback provided to the user via the robot appendage(s), and training and execution modules 122, 120 that govern the robot's overall behavior in training and execution mode, respectively. Of course, the various functionalities may be grouped and organized in many alternative ways.

To facilitate task-centered training via simple, intuitive user interactions, the computer 700 may store, in system memory 704 or storage device 706, a library of prototypes for elementary tasks (such as picking up or putting down an object) and associated objects (such as a type of widgets to be picked up) and places (such as a conveyor belt). During training, the training module 122 instantiates and populates these prototypes based on user and sensory input. For example, when a user has positioned the robot gripper above or around a certain object and pushed a button to indicate that she wants the robot to pick up the object, the training module 122 may create an instance of a pick-up prototype and associated place and object prototypes. Then, the robot may take an image of the object with its wrist camera 216, analyze the image with its image-processing module 712 to extract relevant visual characteristics, populate the object instance with these visual characteristics, record the gripper's current location to populate the location instance, close its gripper until its force sensors detect resistance, and store the associated distance between its fingers (and any other relevant information) in the pick-up instance. The various populated instances are then stored (in memory 704 or on a storage device 706) for subsequent use. At a later time, when the robot operates in execution mode, the task execution module 120 may return the gripper to the stored pick-up location, monitor that location for objects matching the stored visual characteristics, and, once the robot sees such an object, execute the pick-up instance. Thus, the robot is able to carry out previously trained tasks independently based on current sensory information. More detail about prototypes, instances, and the interplay between the training and task-execution modules 122, 120 is provided in U.S. Provisional patent application No. 61/662,646, filed on Jun. 21, 2012.

The above example illustrates how the user interface described herein, in conjunction with suitable computational functionality, allows a user to train the robot similarly as she would train another human: by showing the robot what to do and how to do it, using visual input and direct mechanical interaction. To interpret the user's input correctly and respond in a manner as the average user would expect, the robot relies on pre-programmed assumptions about the meaning of the user's actions. These assumptions are, preferably, based on common, statistically applicable human behaviors. Of course, due to the nature of human behavior, the assumptions do not hold for every user under all circumstances. Accordingly, the robot allows a user to override the defaults by providing input at a deeper level, for example, via traditional user menus. In some embodiments, the robot acts based on the default assumptions unless and until the user actively interrupts it, e.g., by grabbing the robot's gripper in mid-action or by pushing a button designated for causing the robot to stop its current action. Alternatively, the robot may, in response to initial user input, pause for a specified time, and then proceed with the default unless the user has provided additional information in the meantime. In other embodiments, the robot explicitly solicits user confirmation of the default, or alternative instructions. For example, if the user orients the robot's wrist camera so as view an object on a working surface and pushes a button on the wrist cuff 600, the robot may respond by displaying on the screen the question "Pick up object?" If the user answers in the affirmative (e.g., by pushing the button again), the robot proceeds to lower its gripper and pick up the object. Otherwise, the robot may present a selection of alternative tasks (including, e.g., the task of generating a visual model of the object) for the user to choose from.

As the user gets into deeper levels of interaction, the technical knowledge required of him generally increases. In fact, to accommodate a traditional robot trainer with a high level of technical expertise and a desire to precisely control the robot's actions in detail, the robot may provide an alternative "expert" interface that circumvents the simpler, more intuitive user interface. In preferred embodiments, the user may choose among various levels at which she can interact with the robot, where each level requires a different amount of detail provided by the user, and the robot supplies the remaining information (if any) based on its pre-programmed defaults. Consider, for example, a training interaction in which the robot learns how to pick up a particular object. The robot may, by default, lower its gripper (with its fingers surrounding the object) until it is within a specified small distance (e.g., 1 cm) from the working surface (as measured, e.g., with the range sensor built into the wrist), and then close the gripper around the object until it measures a specified push-back force from the object. The robot may then attempt to lift the object; if the operation is successful, it records the magnitude of the push-back force in the associated pick-up instance, and if the object remains on the working surface when the gripper is lifted, the robot repeats its attempt with a higher force. This way, the robot can iteratively determine the appropriate force for lifting and holding the object. Instead of letting the robot figure out the relevant parameters itself, however, the user may decide to enter some or all of them directly. In certain instances, for example, the user may want to alter the height of the robot gripper above the working surface during pick-up. Further, the user may already know the optimal force applied to the object to hold and lift it (e.g., from previous experience), and may, therefore, simply enter this force, circumventing the need for trial and error by the robot. Different training levels reflect different amounts of information entered by the user to replace default values, with more "expert" levels corresponding to greater user input and less reliance on the defaults.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. In particular, embodiments of the invention need not include all of the features or have all of the advantages described herein. Rather, they may possess any subset or combination of features and advantages. Accordingly, the described embodiments are to be considered in all respects as only illustrative and not restrictive.

What is claimed is:

1. A robot capable of direct interaction with a user, comprising:
   a robot body comprising a torso and, attached thereto, a head and at least one appendage; and
   integrated into the robot body, a user interface comprising (i) a visual display for conveying information to the user; (ii) at least one camera for acquiring images of an environment of the robot; and (iii) at least one mechanical input device responsive to at least one of touch or mechanical actuation; and
   a processor for processing input acquired by the user interface and, based thereon, controlling the at least one appendage or the visual display, wherein the user interface is operable in a training mode whereby, based on user operation of the interface, the processor identifies and stores parameters relating to autonomous performance of a sequence of robot movements for repeated execution.

2. The robot of claim 1, wherein the user interface is configured to facilitate programming or the robot.

3. The robot of claim 1, wherein the visual display is configured to display an image captured by the at least one camera, a graphical user interface, and computer graphics showing a facial expression.

4. The robot of claim 3, wherein the visual display is configured to display the image, the graphical user interface, and the facial expression are displayed alternately.

5. The robot of claim 1, wherein the at least one mechanical input device comprises identical navigators placed on two sides of the torso and on each of the at least one appendage.

6. The robot of claim 5, wherein the navigators are collectively configured such that a series of user inputs provided via multiple of the navigators causes the same response as the series of user inputs provided via a single one of the navigators.

7. The robot of claim 5, wherein each navigator comprises a plurality of mechanically actuated elements.

8. The robot of claim 1, wherein the at least one mechanical input device comprises a plurality of mechanical input devices disposed in different locations on the robot, the processor being configured to cause the robot to turn toward an estimated location of a user in response to user manipulation of a mechanical input device and based on the location of the manipulated input device.

9. The robot of claim 8, wherein the plurality of mechanical input devices comprises touch pads disposed on shoulders of the robot.

10. The robot of claim 8, wherein the plurality of mechanical input devices comprises at least one wrist cuff attached to the at least one appendage at a distal end thereof.

11. The robot of claim 8, wherein causing the robot to turn toward the user comprises causing the visual display to face the user.

12. The robot of claim 8, wherein causing the robot to turn toward the user comprises moving one of the at least one appendages toward the user.

13. The robot of claim 1, further comprising a base to which the body is mounted, the base comprising a horizontal portion flippable between an upward orientation that contributes a first height to the base and a downward orientation that contributes a second height to the base, the first height being different from the second height.

14. A robot configured for interaction with a user, comprising:
- a plurality of user input devices disposed in different locations on the robot; and
- a processor for causing the robot, in response to input provided via any of the user input devices and based on a location thereof, to (i) estimate a location of the user and (ii) turn toward the estimated location.

15. A robot configured for interaction with a user, comprising:
- a robot body comprising a torso and, attached thereto, a head and at least one appendage;
- a plurality of identical navigators, disposed in different locations on the robot, for receiving input from a user; and
- a processor for processing the input and, based thereon, controlling an action of the at least one appendage,
- wherein the navigators and processor are collectively configured such that a series of user inputs provided via multiple of the navigators causes the same action as the series of user inputs provided via a single one of the navigators.

* * * * *